2 Sheets—Sheet 1.

T. M. BRINTNALL.
RECLINING CHAIR.

No. 178,720. Patented June 13, 1876.

Witnesses;
F. W. Howard
Edwin James

Inventor;
Thomas M. Brintnall.
per J. E. H. Holmead,
Attorney.

N. PETERS, PHOTO-LITHOGRAPHER, WASHINGTON, D. C.

T. M. BRINTNALL.
RECLINING CHAIR.

No. 178,720.

2 Sheets—Sheet 2.

Patented June 13, 1876.

Witnesses:
H. W. Howard
Edwin James

Inventor,
Thomas M. Brintnall
per J. E. P. Holmead.
Attorney.

UNITED STATES PATENT OFFICE.

THOMAS M. BRINTNALL, OF NEW YORK, N. Y., ASSIGNOR OF ONE-HALF HIS RIGHT TO JOHN GOODCHILD, OF SAME PLACE.

IMPROVEMENT IN RECLINING-CHAIRS.

Specification forming part of Letters Patent No. 178,720, dated June 13, 1876; application filed May 3, 1876.

*To all whom it may concern:*

Be it known that I, THOMAS M. BRINTNALL, of the city and State of New York, have invented certain Improvements in Reclining-Chairs, of which the following is a full, clear, and exact description, reference being had to the accompanying drawing, and the letters of reference marked thereon, making a part of this specification, in which—

Figure 1:
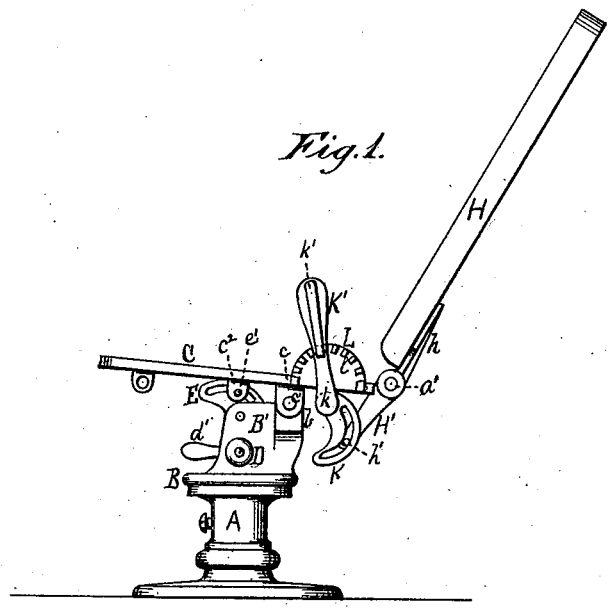
Figure 2:
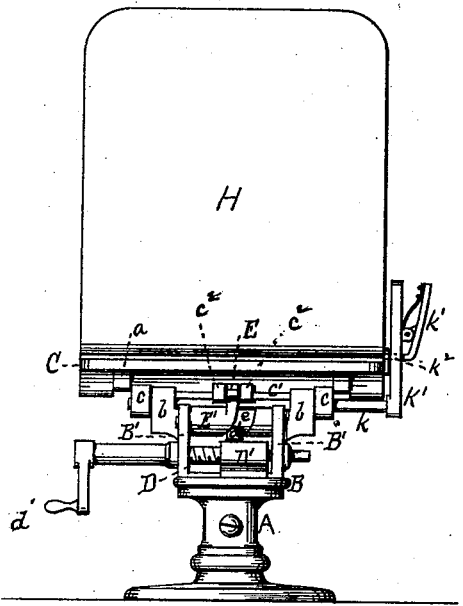
Figure 3:
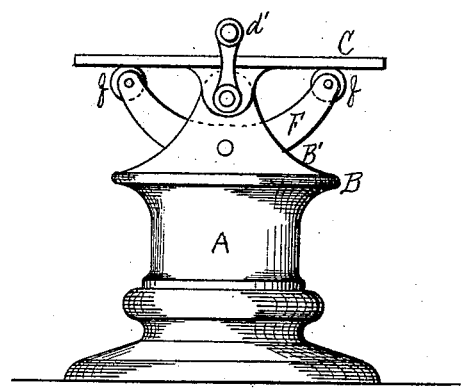
Figure 4:
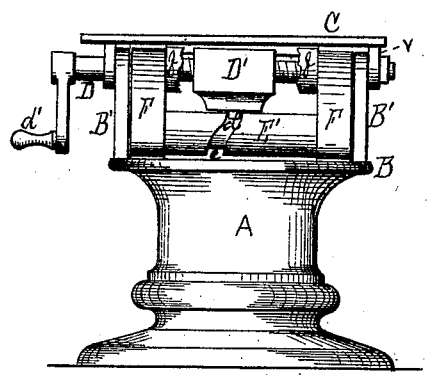
Figure 5:
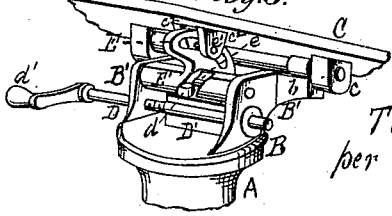

Figure 1 is a side view of my improved chair. Fig. 2 is a front view of the same. Figs. 3 and 4 represent a modification of a portion of the operating mechanism, side and front views being given. Fig. 5 is a perspective view of my improved chair, the back, and its locking mechanism, and the lower portion of its pedestal being removed.

The nature of my invention consists in operating the seat by an automatic locking-cam, and also in operating the back by a cam secured to a shaft running transversely, and journaled in bearings under the seat, and which is operated by a lever attached to one end of said shaft, and locked by a spring-pawl, fulcrumed in the lever and working in a semicircular rack attached to the chair-seat.

The construction and operation of my invention are as follows:

A is the pedestal. B is the head containing the mechanism for operating the seat. Attached to and extending upward from the head B are two projecting bearings, B' B', which are provided with other bearings, $b\ b$, forming with other bearings, $c\ c$, and the rod $c^1$, the seat-hinge. The bearings $c\ c$ are attached to the seat C underneath the same. The seat-operating mechanism consists in a screw-shaft, D, journaled in the lower part of the bearings B' B', and provided with an operating crank-handle, $d'$. Working on this shaft D, and between the bearings B' B', is a traveling nut, D'. This nut D' is grooved at its bottom, which groove works on a tongue or guide secured to the base of the head B. The object of this tongue and groove is to prevent the nut from turning. The top of this nut D' is provided with a pin or friction-roller, $d$, which travels in a spiral, $e$, cut on the periphery of the sleeve E', to which is secured the slotted or open-faced cam E. This cam E works on a rod or pin, $e'$, secured in the ears $c^2\ c^2$, attached to the seat C, underneath the same, the sleeve E' being journaled in the upper portion of the bearings B' B'. Instead of the above-described mechanism for operating the seat being used, many modifications could be employed, one of which is shown in Figs. 3 and 4. In these figures the screw-shaft D is journaled in ears $v\ v$, attached to the seat C, underneath the same and the pedestal-bearings B' B', forming the seat-hinge. The traveling nut D' is located above the sleeve E', the pin or roller $d$ being attached to the under side of the traveling nut D'. F F, Figs. 3 and 4, are arms, having friction-rollers $f\ f$ attached to their ends. These arms are secured to the spiral sleeve E'. By this means I dispense with the cam E, and change the bearing from the seat-hinge to the friction-rollers $f\ f$, hinging the seat at or near the middle. In ears $a\ a$, attached to the back of the seat C, is journaled a shaft, $a'$, to which is secured the plate $h$, attached to the back H. From the bottom of this plate $h$ extends an arm, H', provided with a pin, $h'$, at its lower end. This pin $h'$ works in a slotted or open-faced cam, K, secured to a shaft, $k$, which is journaled in bearings attached to the seat C, underneath the same. To the end of this shaft $k$ is attached the operating-lever K', to which is fulcrumed the spring-pawl $k^1$. This lever K' is provided with an aperture through which works the bent end $k^2$ of the spring-pawl, which engages with the teeth $l$ of the semicircular plate L, secured to the side of the seat C, and by which means the back is held in any position, being moved thereto by means of the lever K'.

The operation of the seat is as follows: If the crank-handle $d'$ is turned in one direction, the traveling nut D' is caused to move in the direction of the handle $d'$. This movement causes the sleeve E' to revolve, carrying with it the cam E, the open face of which, impinging against the rod or pin $e'$, causes the seat C to be tilted upward. To bring the seat back again, reverse the movement of the handle $d'$.

What I claim as new, and desire to secure by Letters Patent of the United States, is—

1. The hinged back H, operated by means of a slotted cam, substantially as and for the purpose specified.

2. A hinged seat, C, in combination with open-faced locking-cam, operated through the means of a screw, substantially as and for the purpose specified.

In testimony whereof I have signed my name to this specification in the presence of two subscribing witnesses.

THOMAS M. BRINTNALL.

Witnesses:
 EDWIN JAMES,
 PHILIP F. LARNER.